Figure 1:
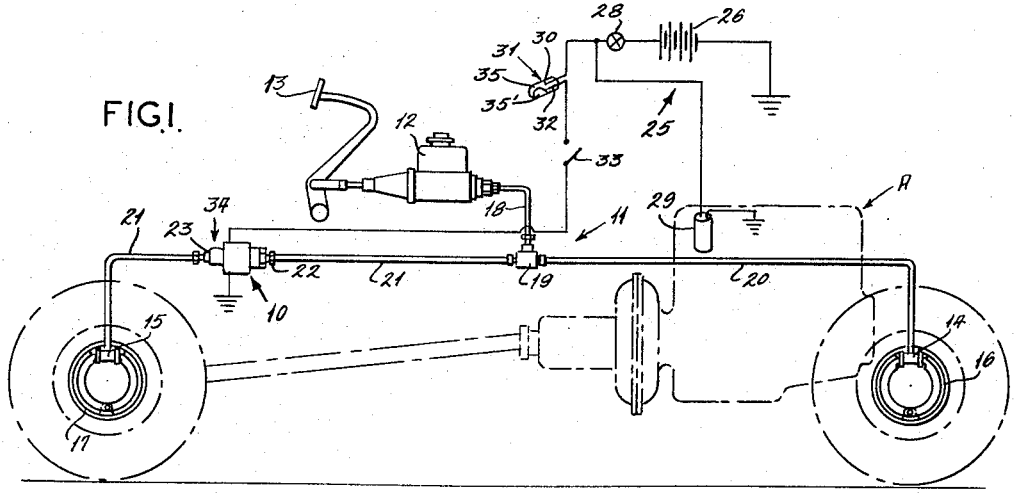

Nov. 10, 1959 W. R. FREEMAN 2,912,070
RATIO CHANGER
Filed June 6, 1955

INVENTOR:
WALTER R. FREEMAN
By Gravely, Lieder, Woodruff & Wills
ATTORNEYS.

United States Patent Office 2,912,070
Patented Nov. 10, 1959

2,912,070

RATIO CHANGER

Walter R. Freeman, Portage Des Sioux, Mo., assignor to Wagner Electric Corporation, St. Louis, Mo., a corporation of Delaware Application June 6, 1955, Serial No. 513,330

1 Claim. (Cl. 188—152)

This invention relates generally to the automotive brake art and more particularly to an improved ratio changer for use in a four wheel hydraulic brake system.

It is well known in the automotive brake art that the deceleration of a motor vehicle or its travel on a downhill grade results in a weight shift from the rear to the front wheels thereof. In inclement weather when the road is slippery, the load shift to the front wheels of a passenger car reduces the traction of the rear wheels so that normal braking pressures will cause the rear wheels to skid. Accordingly, the preferred application of ratio changers in the brake system of passenger cars is between the master cylinder and the fluid motors of the rear wheel brakes so that a smaller braking force is applied thereto and skidding is prevented, whereas the increased traction of the front wheels permits normal braking pressures thereon without causing skidding. However, in the case of a tractor-trailer train where there is no appreciable load shift during deceleration, the preferred application of the ratio changer is between the master cylinder and the fluid motors of the front wheel brake assemblies, whereby better steering control is effected due to the reduced braking force applied thereto.

The principal object of the present invention is to provide a novel ratio changer in a hydraulic brake system which is operative to prevent the application of a full braking force on one set of wheels when a predetermined rate of deceleration occurs during a braking application.

Another object is to provide a ratio changer which may be installed in the brake system of any motor vehicle to create a pressure differential between the front and rear wheel brake assemblies during the time that the redistribution of the vehicle weight incident to deceleration or the like takes place.

These and other objects and advantages will become apparent hereinafter.

Briefly, the invention comprises a ratio changer positioned between the master cylinder and one set of brake assemblies in a brake system, the ratio changer having a passageway permitting unrestricted flow of fluid therethrough when the ratio changer is inoperative, and valve means movable in the ratio changer to seal the passageway after an initial braking force has been applied to all of the brake assemblies, the resilient valve means being releasably maintained in passageway sealing position by yieldable means of appreciable force.

The invention also consists in the parts in the combinations and arrangements of parts hereinafter described and claimed.

Figure 2:
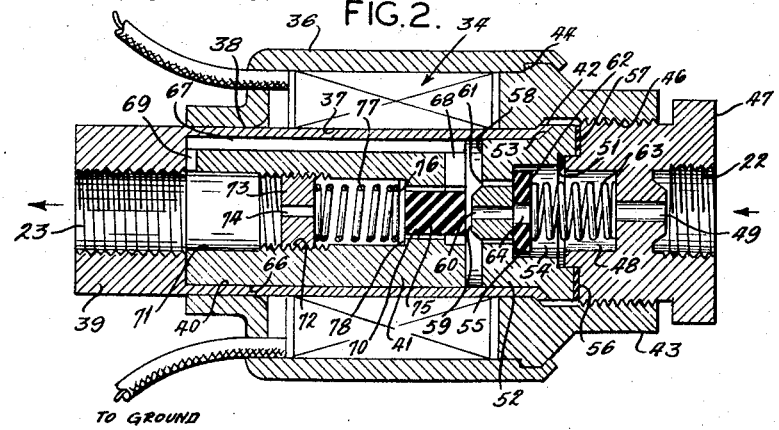
Figure 3:
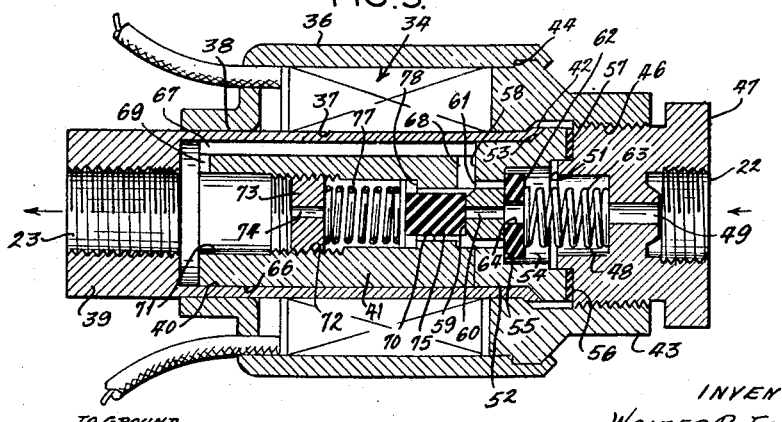

In the accompanying drawing which forms a part of this specification and wherein like numerals refer to like parts wherever they occur:

Fig. 1 is a diagrammatic view of an automotive brake system including a ratio changer constructed in accordance with the teachings of the present invention, Fig. 2 is a longitudinal sectional view of the ratio changer showing the parts thereof in inoperative position, and Fig. 3 is a view similar to Fig. 2, but showing the parts of the ratio changer in operative position.

Referring to Fig. 1 of the drawing, a ratio changer 10 embodying the teachings of the present invention is shown positioned in a brake system 11 of a motor vehicle A. The brake system 11 includes a conventional master cylinder 12 actuated by a foot pedal 13 to build up fluid pressure in fluid motors 14 and 15 of the front and rear wheel brake assemblies 16 and 17, respectively. An outlet conduit 18 is connected between the outlet of the master cylinder 12 and a T 19, a conduit 20 connects one outlet of the T 19 to the fluid motors 14 in the front brake assemblies 16 and another conduit 21 connects the other outlet of the T 19 to the fluid motors 15 in the rear brake assemblies 17 of the vehicle A. The ratio changer 10 is shown positioned in the conduit 21 to the rear brake assemblies 17 for passenger car use, the ratio changer 10 being provided with an inlet 22 and an outlet 23 to which the conduit 21 is coupled. As will become apparent hereinafter, the ratio changer 10 may be connected in the conduit 20 to the front brake assemblies 16 when installed in a tractor-trailer train.

An electrical circuit 25 for controlling the operation of the ratio changer 10 includes a battery 26 having its negative terminal connected to ground and its positive terminal connected through an ignition switch 28 to an ignition coil 29. The ignition switch 28 is also connected to one terminal 30 of an inertia switch 31, and the other terminal 32 of the inertia switch 31 is connected to a manually operated master switch 33, which is located on the dashboard of the vehicle A so the driver may render the ratio changer 10 inoperative, if desired. The master switch 33 is connected to a solenoid coil 34 (Figs. 2 and 3) in the ratio changer 10, the solenoid coil 34 being connected to ground whereby a completed electrical circuit is provided to energize the solenoid coil 34 when all of the switches are closed. As shown in Fig. 1, the inertia switch 31 includes the terminals 30 and 32, which protrude into a casing 35 having a globule of mercury 35' or a similar electric current carrying material therein. The casing 35 is mounted at a predetermined angle relative to the chassis of the vehicle A so that the mercury 35' will normally be at the lower end of the casing 35 out of contact with the terminals 30 and 32 at the upper end thereof. A predetermined rate of deceleration of the vehicle A will be effective to move the mercury 35' into contact with the terminals 30 and 32 whereby the electrical circuit 25 will be completed and the solenoid coil 34 energized, as will be described hereinafter.

Referring now to Figs. 2 and 3, the solenoid coil 34 is enclosed by a cylindrical casing 36, which defines the outer periphery of the ratio changer 10. The solenoid coil 34 has a cylindrical bore 37 in which a non-magnetic plunger guide member 38 is positioned. The guide member 38 extends to the left or outwardly through the casing 36 and has an end portion 39 which is bored and tapped to form the outlet 23. The outlet 23 is connected to the rear brake assemblies 17, as described hereinbefore. The guide member 38 has a counterbore providing an inner wall 40 in which a plunger or armature 41 is slidably positioned. The end of the guide member 38 opposite to the outlet end portion 39 is flared outwardly, as at 42, for securing an annular coil-enclosing casing 43 in abutting relation with the right-hand end of the solenoid casing 36 as at 44. The right-hand end of the coil-enclosing casing 43 is bored and tapped to form a threaded connection 46 in which an end plug 47 may be positioned to enclose the right-hand end of the ratio changer 10. The end plug 47 has the threaded inlet 22 formed in its outer end and a chamber or recess 48 formed in its inner end with an opening or bore 49 extending therebetween.

The flared end portion 42 of the guide member 38 is enclosed by a valve or plunger stop element 52 having an angular surface 53 in abutment therewith, the outer periphery of the stop element 52 being in contact with the inner wall 40 of the guide member 38. The stop element 52 is provided with a central chamber 54 forming a radially-extending wall 55 intermediate the ends of the stop element 52. The right-hand end of the plunger stop element 52 is positioned adjacent to the inner end of the end plug 47 and an annular gasket 57 may be provided to form a seal therebetween. The left-hand end 58 of the stop element 52 is provided with a central projection or seat 59, and a central opening 60 is formed in the stop element extending from the seat 59 to the central chamber 54. A plurality of ports 61 are also formed in the stop element 52 outwardly of the central opening 60 extending from adjacent to the seat 59 to the central chamber 54.

A washer valve 62 is loosely positioned in the central chamber 54 of the stop element 52 in abutting relation with the radial wall 55 by a relatively weak spring 63, which extends into the chamber 48 of the end plug 47. The washer valve 62 serves to restrict the flow of fluid through the ports 61 to a rightward direction, as will be described more fully hereinafter. However, an opening 64 formed in the washer valve 62 registers with the central opening 60 in the stop element 52 so that fluid under pressure will flow through the inlet 20 from the master cylinder 12 and subsequently pass through the bore 49 and the chamber 48 in the end plug 47 and the chamber 54 in the stop element 52 to the opening 64 in washer valve 62. Fluid is then forced through the opening 64 of the washer valve 62 and into the central opening 60 of the stop element 52, the fluid pressure maintaining the valve 62 in abutment against the radial wall 55 to seal the ports 61.

The armature 41 is provided with an outer surface 66 in slidable contact with the inner wall 40 of the guide member 38 and has a longitudinal groove 67 extending axially between the opposite ends thereof. A radial slot 68 is formed in the end of the armature 41 adjacent to the stop element 52, and another radial slot 69 is formed in the opposite end of the armature 41, each of said slots 68 and 69 being in communication with the axial groove 67 to provide a by-pass for brake fluid from the central opening 60 in the stop element 52 to the outlet 23. It is to be understood that the armature 41 may be provided with flat surfaces or it may have a hexagonal or octagonal-shaped body in order to facilitate the passage of fluid, thereby obviating the need for the axial groove 67. The armature 41 is also provided with a bore 70 and a counterbore 71, the latter being tapped as at 72 to provide a threaded connection for an annular plug 73 having a resilient valve a central opening or port 74 therein. A resilient valve member 75 loosely positioned in the bore 70 is provided for sealing contact with the seat 59 of the stop element 52 when the solenoid coil 34 is energized, the valve member 75 being carried by a cylindrical supporting member 76. The supporting member 76 is slidably positioned in the counterbore 71 and biased to the right by a valve spring 77 disposed between the plug 73 and the supporting member 76.

As shown in Fig. 2, when the ratio changer 10 is inoperative the supporting member 76 abuts the radial shoulder 78 formed between the bore 70 and counterbore 71 whereby the right end of the valve member 75 is positioned in the same plane as the right end of the armature 41. Therefore, whenever the ratio changer 10 is inoperative because the solenoid coil 34 is unenergized, the first part of a braking application will cause the fluid from the master cylinder 12 to flow through the central opening 60 in the stop element 52 and past the armature 41 to the outlet 23 in the end portion 39 of the guide member 38 so that equal fluid pressures are initially being built up in the front and rear brake assemblies 16 and 17. This initial braking effort in the front and rear brake assemblies 16 and 17 will result in the deceleration of the vehicle A, a predetermined deceleration being effective to close the inertia switch 31 and complete the electrical circuit 25 when the master switch 33 is closed. The solenoid coil 34 is thus energized and the ratio changer 10 becomes operative to provide a differential in braking pressures between the front and rear wheels of the vehicle A during the remainder of the braking application, as will now be described.

Upon the energization of the solenoid coil 34, the armature 41 is moved to the right by the magnetic attraction between the armature 41 and the stop element 52 so that the valve member 75 is seated on the seat 59 of the stop element 52. As shown in Fig. 3, during the time that the solenoid coil 34 is energized, the right-hand end of the armature 41 abuts the left-hand end 58 of the stop element 52 and the valve member 75 is moved to the left relative to the right-hand end of the armature 41 so that the supporting member 76 is positioned away from the radial shoulder 78 and the valve spring 77 is compressed. The biasing action of the valve spring 77 provides a force that holds the valve member 75 against the seat 59 so that the central opening 60 in the stop element 52 is sealed by the valve member 75. Further passage of fluid through the ratio changer 10 is thus prevented and the fluid pressure on the rear wheel brake assemblies 17 is maintained at a constant value whereas the pressure developed by the master cylinder 12 will continue to increase as the foot pedal 13 is further depressed, the increase in pressure being effective on the front wheel brake assemblies 16 and the right end of the valve member 75. When the pressure in the central opening 60 of the stop element 52 is increased sufficiently to overcome the biasing action of the valve spring 77, the valve member 75 will be moved off the seat 59 of the stop element 52 and additional fluid will flow past the armature 41 to the rear wheel brake assemblies 17. The strength of the valve spring 77 is predetermined so that once the pressures exerted on the opposite ends of the valve member 75 are equalized, the differential between the fluid pressures will remain constant. For instance, the valve spring 77 may have a pre-selected strength that requires an effective pressure of 300 p.s.i. in the central opening 60 before the valve member 75 has equal pressures exerted thereon. If an initial braking pressure of 100 p.s.i. was effective in all of the fluid motors 14 and 15 when the solenoid 34 was energized, then the pressure differential established between the front and rear wheel brake assemblies is 200 p.s.i. This differential will remain substantially constant during any subsequent increase in the pressure in the central opening 60 inasmuch as the slightest difference in the pressures on opposite ends of the valve member 75 will unseat the valve member 75 and the pressures again will become balanced.

When the foot pedal 13 is released and the rate of deceleration is decreased or when the vehicle A has been stopped, the mercury 35' in the inertia switch 31 will move to its lowest point whereby the contact between terminals 30 and 32 will be broken and the electrical circuit 25 opened. The solenoid coil 34 is thus de-energized and the magnetic attraction between the armature 41 and the stop element 52 is eliminated. As the fluid flows back to the master cylinder 12, the pressure of the valve spring 77 acting on the plug 73 is effective to move the armature 41 away from the left end 58 of the stop element 52. It should be noted that the fluid in the rear wheel brake assemblies 17 is always permitted to return to the master cylinder 12 through the ports 61 in the stop element 52 by overcoming the relatively weak spring 63 and moving the washer 62 out of contact with the radial wall 55 of the stop element 52. It is now apparent that when the ratio changer 10 is operative a reduced fluid pressure is applied to the rear wheel brake assemblies 17 so that the reduced traction of the rear wheels of a passenger car due to the shift of weight to the front wheels during a braking application will not result in skidding, as described hereinabove.

Although the ratio changer 10 has been illustrated and described as positioned in the conduit 21 to the fluid motors 15 for the rear wheel brake assemblies 17 in order to prevent the skidding of the rear wheels of passenger cars, it is to be understood that the ratio changer 10 may be positioned in the conduit 20 to the fluid motors 14 for the front wheel brake assemblies 16 of tractor-trailer trains. Inasmuch as there is no reduction in traction of the rear wheels of the tractor because of the shift of weight in the trailer during a braking application, better steering control results from positioning the ratio changer 10 between the master cylinder 12 and the front wheel brake assemblies 16 so that a reduced braking force is exerted therein.

All changes and modifications of the example of the invention herein chosen for the purposes of disclosure are contemplated, which do not constitute departures from the spirit and scope thereof.

What I claim is:

A hydraulic brake system for a motor vehicle including front and rear sets of fluid motors, a master cylinder adapted to be selectively actuated, conduit means connecting said master cylinder to said front and rear sets of motors, a ratio changing device connected in said conduit means, said ratio changing device comprising a casing having an inlet in communication with said master cylinder and an outlet in communication with one of said sets of motors, said ratio changing device including an inlet chamber in communication with said inlet and an outlet chamber in communication with said outlet, a stop element between said inlet and outlet chamber and having a first opening formed therethrough and providing communication between said chambers, said stop element also having a second opening formed therethrough and providing communication between said chambers, an armature movably mounted in said outlet chamber, said armature including fluid by-passing means providing communication between said stop element and said outlet chamber, a first valve element movably mounted in one end portion of said armature, and movable relative thereto adjacent said stop element, first resilient means urging said valve element toward said stop element, a second valve element movably mounted in said inlet chamber for sealing said second opening, said second valve element having an opening formed therethrough providing communication with the first opening in said stop element, second resilient means normally urging said second valve element into sealing relationship with respect to said second opening, and an electrical circuit including a solenoid having a winding disposed in surrounding relationship to said armature for urging said armature into sealing relationship with respect to said stop element upon energization of the solenoid, said electrical circuit also including a source of electrical energy, an inertia responsive switch connected in said circuit and a selectively operable switch also connected in said circuit, the winding of said solenoid, the manually operated switch, the inertia responsive switch and the source of electrical energy being connected in series, whereby the ratio changing device may be rendered inoperative when the manually operable switch is open, and further, wherein when the manually operable switch is closed, closing of the inertia switch causes actuation of the solenoid for moving the armature into sealing relationship with said stop element.

References Cited in the file of this patent

UNITED STATES PATENTS

| | | |
|---|---|---|
| 2,028,491 | Barrett et al. | Jan. 21, 1936 |
| 2,115,071 | Hunt | Apr. 26, 1938 |
| 2,143,871 | Fator | Jan. 17, 1939 |
| 2,181,717 | Wood et al. | Nov. 28, 1939 |
| 2,241,191 | Freeman | May 6, 1941 |
| 2,262,842 | Goepfrich | Nov. 18, 1941 |
| 2,283,713 | Wolf | May 19, 1942 |
| 2,391,129 | Chambers | Dec. 18, 1945 |
| 2,638,118 | Chandler | May 12, 1953 |
| 2,751,575 | Jacobs et al. | June 19, 1956 |

FOREIGN PATENTS

| | | |
|---|---|---|
| 694,541 | Great Britain | July 22, 1953 |